United States Patent [19]

Lootens et al.

[11] 4,359,024

[45] Nov. 16, 1982

[54] ENGINE ATTACHMENT

[76] Inventors: Charles W. Lootens, 847 Yale Dr., Mansfield, Ohio 44907; John C. Leonard, 121 Diamond, Crestline, Ohio 44827

[21] Appl. No.: 243,099

[22] Filed: Mar. 12, 1981

[51] Int. Cl.$^3$ ........................ F02D 9/00; F02M 13/04; F16D 21/04

[52] U.S. Cl. .............................. 123/198 F; 123/52 M; 123/403

[58] Field of Search ................... 123/198 F, 52 M, 403

[56] References Cited

U.S. PATENT DOCUMENTS

| | | | |
|---|---|---|---|
| 2,875,742 | 3/1959 | Dolza | 123/198 F |
| 2,919,686 | 1/1960 | Mick | 123/198 F |
| 2,947,298 | 8/1960 | Dolza | 123/198 F |
| 4,105,010 | 8/1978 | Rand, Jr. | 123/198 F |
| 4,106,471 | 8/1978 | Nakajima et al. | 123/198 F |
| 4,143,635 | 3/1979 | Iizuka et al. | 123/198 F |
| 4,187,824 | 2/1980 | Connolly | 123/198 F |

FOREIGN PATENT DOCUMENTS

| | | | |
|---|---|---|---|
| 771649 | 4/1957 | United Kingdom | 123/198 F |

*Primary Examiner*—Wendell E. Burns
*Attorney, Agent, or Firm*—Flynn, Thiel, Boutell & Tanis

[57] ABSTRACT

An apparatus for regulating the quantity of air-fuel mixture supplied to each of the cylinders of an internal combustion engine and for selectively obstructing the flow of the air-fuel mixture to one or more such cylinders to effectively disable those cylinders. A butterfly valve is provided for each cylinder of the engine and is positioned in the passage in the intake assembly which supplies the air-fuel mixture to that cylinder at a location adjacent the end of the passage which is remote from the carburetor. The valves are controlled individually or in groups by a manually operated control mechanism. In one embodiment, the intake assembly includes a valve plate which is positioned between the engine block assembly and the intake manifold, with a portion of each branch passage being defined by a respective opening through the valve plate and each butterfly valve being provided in a respective one of such openings in the valve plate.

8 Claims, 5 Drawing Figures

ENGINE ATTACHMENT

FIELD OF THE INVENTION

This invention relates to an improved, multi-cylinder, reciprocating piston, four stroke cycle, internal combustion engine and, more particularly, to such an engine equipped with a mechanism for regulating the quantity of air-fuel mixture supplied to various cylinders of the engine.

BACKGROUND OF THE INVENTION

An internal combustion engine for motor vehicle purposes and the like is typically designed with the carburetor in a central location on the engine in relation to the cylinders. At low engine speeds, all of the cylinders receive equal amounts of the air-fuel mixture from the carburetor by way of the intake manifold system. At higher engine speeds, however, cylinders closer to the carburetor receive larger amounts of the air-fuel mixture than do cylinders farther from the carburetor. Accordingly, it is desirable to equalize the amounts of air-fuel mixture supplied to the cylinders at higher engine speeds in order to improve the efficiency of the engine.

A related matter is that, when the engine is used to power a vehicle, the engine generally operates under a heavy load only when the vehicle is accelerating or climbing an incline. The rest of the time, the engine operates under a reduced load which, in general, is significantly lower than its maximum power output. Accordingly, an engine used to power an automobile generally operates at less than maximum fuel efficiency a major portion of the time.

Various attempts have been made to solve the foregoing problems, typically through a cylinder disablement scheme in which the fuel efficiency is improved by selectively shutting off the air-fuel supply to several cylinders during periods of time when a reduced power output will adequately operate the vehicle. The air-fuel supply to the cylinders is restored when the engine is operated under a heavy load.

These prior attempts to improve fuel efficiency have generally accomplished their intended purposes, but they have not been satisfactory in all respects. Typically, a single valve is provided in the manifold or the carburetor which disables an entire group of cylinders simultaneously, rather than independently controlling the air-fuel mixture for each of the cylinders. Accordingly, such devices are usually incapable of equalizing the amounts of air-fuel mixture received by cylinders near the carburetor with respect to cylinders farther from the carburetor because grouping is dictated by the ignition sequence rather than cylinder location. Further, the shut-off valves in these known systems are typically operated by a solenoid or an equivalent device, such that the valve is either completely opened or completely closed and cannot be set to one of several intermediate positions in order more precisely to regulate the flow of the air-fuel mixture.

A more serious problem with the known devices is the fact that they typically have major structural differences with respect to conventional automobile engines. Specifically, a special carburetor and/or intake manifold is generally required, and sometimes even the engine block and/or cylinder head must be significantly modified. As a result, many of the prior solutions to the problems described above either cannot be incorporated into the existing engines of vehicles which have already been manufactured or else they can be incorporated into such engines only through major and expensive modifications of the conventional components of the engine or through the substitution of expensive new components.

It is therefore an object of this invention to provide an apparatus for regulating the quantities of the air-fuel mixture supplied to the cylinders of an internal combustion engine in which the air-fuel mixture supplied to each of the cylinders can be regulated independently, whereby the flow of the air-fuel mixture to a selected number of cylinders can be completely shut off.

It is a further object of the invention to provide an apparatus, as aforesaid, in which the mechanism regulating the flow of the air-fuel mixture to each cylinder is adjustable to an infinite number of settings.

It is a further object of the invention to provide an apparatus, as aforesaid, which is simple, inexpensive and durable.

It is a further object of the invention to provide an apparatus, as aforesaid, which is easy to install in an existing vehicle engine and which requires little or no modification of the conventional components of the engine.

SUMMARY OF THE INVENTION

The objects and purposes of the invention, including those set forth above, are met by providing a multi-cylinder, reciprocating piston, internal combustion engine comprising a block assembly having a plurality of cylinders therein, each cylinder having a valved intake port communicating therewith, a carburetor for supplying a combustible air-fuel mixture to the cylinders, and an intake manifold connecting the carburetor and the block assembly, the intake manifold having a plurality of branch passages therein extending from the carburetor to the respective intake ports of the cylinders for supplying the air-fuel mixture to the respective cylinders. A valve is provided in each branch passage of the intake manifold adjacent to the associated intake port for regulating the flow of the air-fuel mixture through the branch passage. Each valve is preferably a butterfly valve comprising a shaft pivotally received in coaxial bores on opposite sides of the passage and a plate-like vane parallel to and secured to the shaft within the passage, whereby in response to rotation of the shaft, the vane is movable through a range of positions which is bounded by a position substantially parallel to the lengthwise extent of the passage which minimally obstructs the passage and a position substantially perpendicular to the lengthwise extent of the passage which substantially completely obstructs the passage. One end of the shaft extends to a point external of the intake assembly and has a control arm securely affixed thereto. A control mechanism is connected to each control arm at a point remote from the shaft for moving the control arm to effect rotation of the shaft and movement of the vane. Each butterfly valve can be controlled independently by the control mechanism, or two or more valves can be operated simultaneously by linking their control arms together. The control mechanism can be manually or automatically operated.

In one embodiment, the intake assembly includes a unitary valve block which is located between the engine block and the intake manifold and has passages therethrough which connect the branch passages in the intake manifold to the respective intake ports in the engine block, each butterfly valve being provided within a respective passage in the valve block.

BRIEF DESCRIPTION OF THE DRAWINGS

A more complete understanding of the objects, purposes and advantages of the invention will be apparent to persons acquainted with apparatus of this general type upon reading the following specification and inspecting the accompanying drawings, in which.

Certain terminology will be used in the following description for convenience in reference only and will not be limiting. The words "up", "down", "front" and "rear" will have reference to the illustrated apparatus according to the above descriptions. The words "in" and "out" will refer to directions toward and away from, respectively, the geometric center of the device and designated parts thereof. Such terminology will include the words specifically mentioned, derivatives thereof and words of similar import.

DETAILED DESCRIPTION

Figure 1:
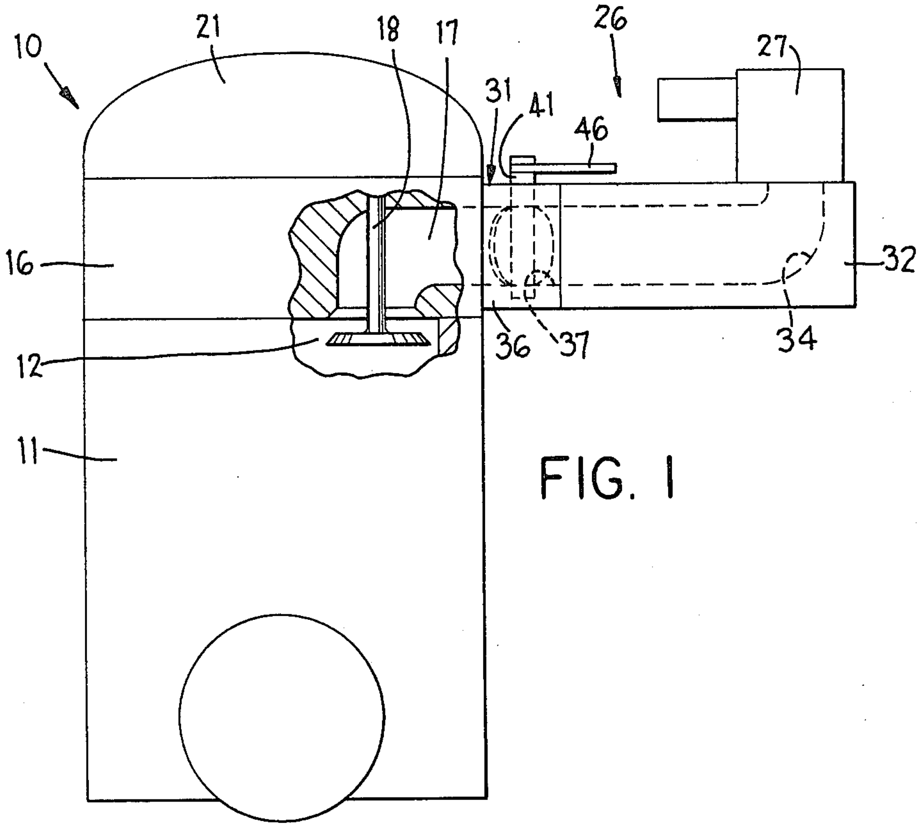
FIG. 1 is a schematic front view, partially in section, of a conventional four-cylinder automotive engine and equipped with a valve assembly, according to the invention.

Referring to FIG. 1, an internal combustion engine 10 comprises an engine block 11 which is conventional in all respects and has four cylindrical cylinders 12, each housing a piston (not shown), in a conventional way. A cylinder head 16 which is also conventional in all respects is securely mounted on the top of the engine block 11 and has four conventional intake ports 17 extending laterally therethrough, each intake port 17 communicating with the upper end of a respective cylinder 12 in the engine block 11. A conventional intake valve 18 is supported in each of the intake ports 17 of the cylinder head 16 in a conventional manner for movement under control of a conventional and not-illustrated valve operating mechanism. A conventional valve cover 21 is mounted on the cylinder head 16 to enclose the mechanism which operates the valves 18. The block 11, the cylinder head 16 and parts thereof will be collectively referred to as a block assembly.

Mounted to the side of the cylinder head 16 is an intake assembly 26 having a carburetor 27 mounted thereon. The carburetor 27 produces a combustible air-fuel mixture and is conventional in all respects. Accordingly, the carburetor 27 is not described in detail herein.

The intake assembly 26 comprises a valve assembly 31 and an intake manifold 32. The intake manifold 32 is preferably conventional in design and has a plurality of branch passages 34 therein for supplying the air-fuel mixture from the carburetor to the respective cylinders 12.

The valve assembly 31 is positioned between the end of intake manifold 32 and the cylinder head 16. The cylinder head 16, valve assembly 31 and manifold 32 are preferably secured together by bolts (not shown) which have the same thread size as the bolts conventionally used to secure the intake manifold 32 directly to the cylinder head 16 in the conventional automotive engines, but which are substantially longer and extend from the intake manifold 32 through openings in the valve assembly 31 and threadedly engage standard threaded holes provided in the cylinder head 16. Thus, the valve assembly 31 can be easily incorporated into an existing conventional engine by removing the bolts attaching the manifold 32 to the cylinder head 16, inserting the valve assembly 31 therebetween, and using the longer bolts to secure these parts together.

Figure 2:
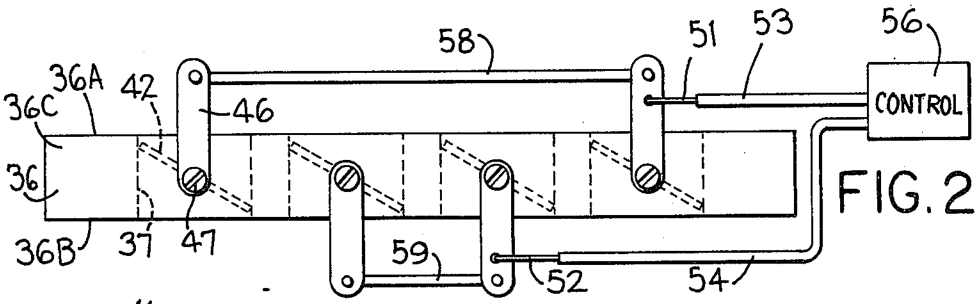
FIG. 2 is a top view of the valve assembly which is a component of the engine of FIG. 1.
Figure 3:
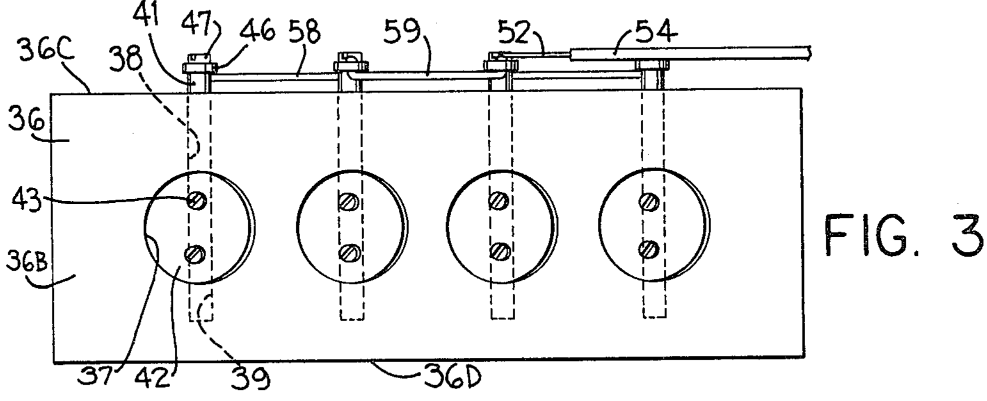
FIG. 3 is a side view of the valve assembly of FIG. 2.

As shown in FIGS. 2 and 3, the valve assembly 31 includes a valve block 36 having a pair of spaced parallel, upright sides 36A and 36B, a top surface 36C and a bottom surface 36D defining an elongated body of rectangular cross section. Four cylindrical openings 37 extend through the valve plate 36, the axis of each opening 37 being substantially perpendicular to the planes of the parallel, upright sides 36A and 36B of the valve block 36. As shown in FIG. 1, each opening 37 connects a respective passage 34 in the intake manifold 32 with a respective intake port 17 in the cylinder head 16.

As shown in FIG. 3, coaxially aligned vertical bores 38 and 39 extend outwardly from diametrically opposite portions of each opening 37. The bore 38 extends upwardly to the top surface 36C of the valve plate 36. A cylindrical shaft 41 is snugly supported in the bores 38 and 39 for pivotal movement about its axis and its upper end extends slightly above the plane of the top surface 36C. A plate-like vane 42 is provided in each opening 37 and is securely mounted on its associated shaft 41 by two screws 43 which extend through the vane 42 and threadedly engage radial openings in the shaft 41. Each vane 42 is pivotal about the axis of its associated shaft 41 in response to rotation of such shaft through a range of positions which include a closed position (FIG. 2) substantially obstructing the opening 37 and an open position substantially parallel to the axis of the opening 37. Each vane 42 is approximately circular, but may have a horizontal dimension which is slightly greater than the diameter of the opening 37 and a vertical dimension which is slightly less than the diameter of the opening 37, such that the vane 42 does not bind against the top and bottom surfaces of the opening 37 when the shaft 41 is pivoted but tightly contacts the side surfaces of the opening 37 when turned to the closed position (FIG. 2).

A control arm 46 is secured to one end to the top of each shaft 41 by a screw 47 and extends radially outwardly away from the shaft 41. Control cables 51 and 52, respectively movable in a lengthwise direction within protective sheaths 53 and 54, are each pivotally connected to a respective control arm 46 at a point remote from the associated shaft 41. Lengthwise movement of each cable 51 or 52 will act through the associated control arm 46 to effect pivotal movement of the respective shaft 41, thereby pivoting the vane 42 within the opening 37 around the axis of the shaft 41.

The control cables 51 and 52 are each connected to a control mechanism 56, which could be any of several conventional types. It could, for example, be an automatic control having a vacuum diaphragm valve responsive to variations in engine vacuum, or a series of manually operable levers provided on the dashboard of the vehicle, each lever being connected to a respective control cable to effect reciprocal lengthwise movement of the cable in response to reciprocal manual movement of the lever. While it will be recognized that a separate control cable, such as the cables 51 and 52, could be provided for each of the control arms 46, thereby providing an independent control for each butterfly valve, satisfactory operation for most applications is achieved by providing only two such cables, 51 and 52, which are respectively connected to one of the outermost control arms 46 and the control arm 46 adjacent thereto, as shown in FIG. 2, and by providing a rigid control link 58 which interconnects the outermost control arms 46 at locations remote from their shafts 41 and by a rigid link 59 which interconnects the other two control arms 46 in a similar manner.

Figure 5:
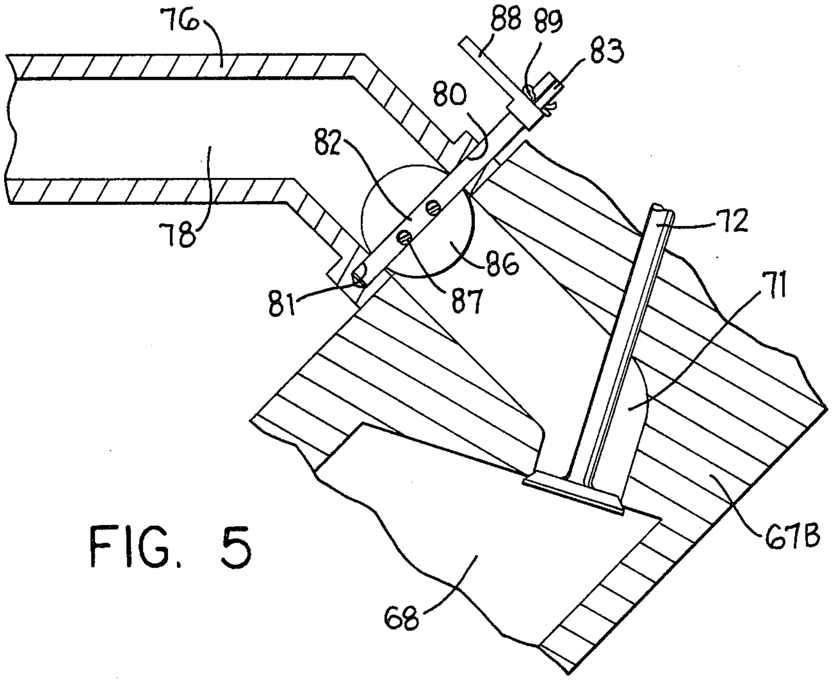
FIG. 5 is an enlarged view of the sectional portion of FIG. 4 illustrating details of the invention.

FIGS. 5 and 6 illustrate an alternate embodiment of the invention as applied to V-6 or a V-8 engine 66. The engine 66 has an engine block 67 which is conventional in all respects and has portions 67A and 67B which diverge upwardly and outwardly in a substantially V-shape. As applied to a V-8 engine, the portion 67B of the engine block 67 has four combustion chambers 68, one of which is shown in FIG. 5, intake ports 71 which each communicate with a respective cylinder 68, and an intake valve 72 in each intake port 71 which is controlled in a conventional manner to regulate the flow of the air-fuel mixture through the intake port 71. An intake manifold 76 extends between and is secured to the portions 67A and 67B of the engine block 67 and has a conventional carburetor 77 centrally mounted thereon which produces a combustible air-fuel mixture. The intake manifold 76 has eight branch passages 78, each branch passage communicating with the carburetor 77 and with the intake port 71 of one of the cylinders 68. Coaxially aligned bores 80 and 81 (FIG. 5) are provided on diametrically opposite sides of each branch passage 78 at the end thereof remote from the carburetor 77 and adjacent to the associated intake port 71, and the bore 80 extends completely through the wall of the branch passage 78. A shaft 82 is snugly and rotatably received within the bores 80 and 81 and one end thereof extends outwardly through the bore 80 to a location spaced slightly from the intake manifold 76 and it has a square tip 83. A substantially circular plate-like vane 86 is provided in each branch passage 78, lies in a plane parallel to the axis of the shaft 82, and is secured to the associated shaft 82 by two screws 87.

Preferably, the bores 80 and 81 are formed in the flange of the branch passage 78, which flange is fixedly attached to the sidewall of the associated portion 67A or 67B of the engine block 67, such that the vane 86 extends partially into the intake port 71 when it is moved to the fully open position, as illustrated in FIG. 5.

A control arm 88 has a square opening at one end thereof which matingly engages the square tip 83 of the shaft 82 to prevent relative rotation between the arm 88 and shaft 82. The arm 88 extends radially outwardly away from the shaft 82. Disengagement of the control arm 88 from the tip 83 of the shaft 82 is prevented by a cotter pin 89 provided in a radial opening through the square tip 83 of the shaft 82.

Each of the control arms 88 is connected to a control mechanism (not shown) which is preferably similar to that discussed hereinabove with respect to the embodiment of FIGS. 1–3 and therefore not described here in detail.

OPERATION

Although the operation of the mechanism described above will be understood from the foregoing description by persons skilled in the art, a summary of such operation is now given for convenience.

Referring to the embodiment illustrated in FIGS. 1–3, if the control cable 51 (FIG. 2) is initially moved toward the control mechanism 56 and the control cable 52 is initially moved away from the control mechanism 56, each of the control arms 46, shafts 41 and vanes 42 will be pivoted about the axes of the shafts 41 to the open position in which each vane 42 extends substantially parallel to the axis of its associated opening 37 and therefore effects a minimal obstruction of the opening 37. Accordingly, the air-fuel mixture produced by the carburetor 27 (FIG. 1) will flow through the passages 34 in the intake manifold 32, through the openings 37 in the valve plate 36, and through the intake ports 17 to the combustion chambers 12. Since the central location of the carburetor 27 on the manifold 32 means that the air-fuel mixture must flow a longer distance through the passages in the intake assembly 26 to reach the two outermost intake ports 17 and the associated combustion chambers 12, the two centrally located cylinders 12 will typically receive a larger quantity of the air-fuel mixture at higher engine speeds than the two outer cylinders. If the operator of the vehicle wishes to equalize the quantity of air-fuel mixture supplied to the two outermost cylinders with respect to the quantity of air-fuel mixture supplied to the two central cylinders, he will manually adjust the lever controlling the cable 52 so that the vanes 42 in the two centrally positioned openings 37 obstruct the flow of the air-fuel mixture therethrough to a greater extent than do the vanes 42 in the two outermost openings 37 obstruct the flow therethrough. Precise equalization is facilitated by the fact that an infinite number of positional settings of the vanes 42 are possible.

If the operator of the vehicle wishes to completely disable two of the combustion chambers in the engine in order to conserve fuel, he can move either of the control cables 51 and 52 to a position in which the associated vanes 42 substantially completely obstruct the associated openings 37, thereby shutting off substantially completely the air-fuel mixture to those combustion chambers so that the engine runs only on the two combustion chambers which are still receiving fuel. The deactivated combustion chambers can be quickly reactivated when full engine power is needed by moving the associated cable 51 or 52 to the position in which the associated vanes 42 extend parallel to the axes of the associated openings 37.

Figure 4:
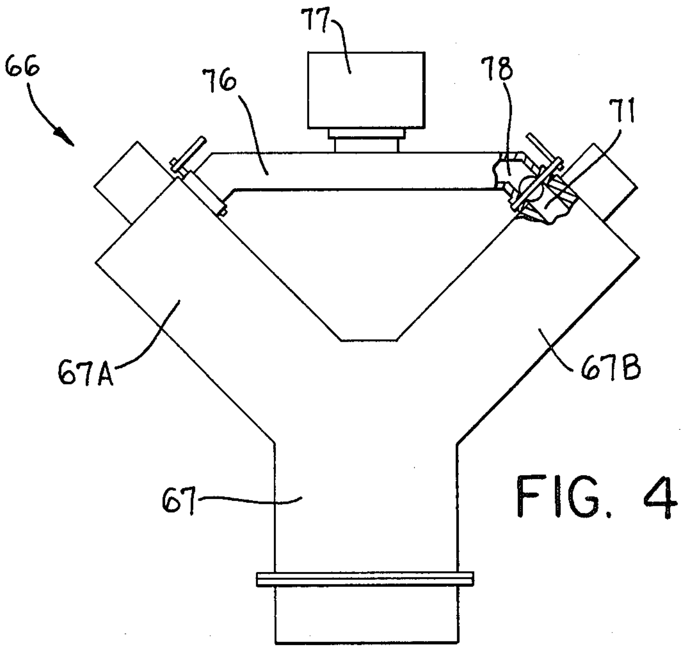
FIG. 4 is a front view, partially in section, of a conventional V-8 automotive engine incorporating an alternate embodiment of the invention.

The operation of the embodiment illustrated in FIGS. 4 and 5 is similar in all respects to the operation described hereinabove with respect to the embodiment of FIGS. 1–3, and is therefore not described here in detail.

Although two preferred embodiments of the invention have been described in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A multi-cylinder, reciprocating piston, four-stroke cycle, internal combustion engine, comprising:
   an engine block assembly having a plurality of cylinders, a reciprocable piston in each cylinder and an intake port for supplying an air-fuel mixture to each said cylinder;

intake means mounted on said engine block assembly and having a plurality of passages, each of said passages being in communication with the intake port of one of said cylinders;

air-fuel mixture supply means connected to said intake means and communicating with each of said passages thereof for supplying an air-fuel mixture to each of said cylinders in said engine block assembly through one of said passages and its associated intake port;

valve means for regulating the quantity of said air-fuel mixture that can flow through said passages, said valve means including a valve positioned in each of said passages at a location remote from said supply means and adjacent to the intake port of its associated cylinder; and control means cooperable with said valve means for selectively operating said valves to effect regulation of the quantity of the air-fuel mixture that can flow through said passages.

2. The internal combustion engine of claim 1, wherein:

said intake means includes first and second coaxial bores provided in facing surfaces of each said passage at the end thereof which is remote from said air-fuel mixture supply means and adjacent to the intake port of said associated cylinder; and each said valve is a butterfly valve and includes a shaft rotatably disposed in said coaxial bores and a substantially planar vane mounted to said shaft parallel thereto within said passage, said vane being movable in response to rotation of said shaft through a range of positions which include a closed position substantially obstructing said passage and an open position minimally obstructing said passage.

3. The internal combustion engine of claim 2, wherein:

each said first bore extends outwardly entirely through said intake means;

one end of each said shaft extends outwardly through said first bore to a location spaced from said intake means;

said valve means includes a radially extending control arm rigidly mounted to said one end of each said shaft; and said control means is drivingly connected to each said control arm at a location spaced from the associated shaft.

4. The internal combustion engine of claim 2, wherein each said vane, when in said open position, is partially disposed within the intake port of said associated cylinder.

5. The internal combustion engine of claim 1, wherein:

said air-fuel mixture supply means is a carburetor; and the ends of said passages in said intake means adjacent said carburetor are in common communication with each other and with said carburetor.

6. The internal combustion engine of claim 1, wherein:

said intake means includes an intake manifold and a valve plate, said valve plate being located between said intake manifold and said engine block assembly and having a plurality of openings therethrough, each said opening being a portion of a respective said passage; and each said valve is located in a respective one of said openings through said valve plate.

7. The internal combustion engine of claim 6, wherein said valve plate is substantially rectangular in shape.

8. A valve assembly mountable between the engine block assembly and the intake manifold of an internal combustion engine, said block assembly having a plurality of cylinders and an intake port for each cylinder, said intake manifold having a plurality of branch passages communicating with means for supplying an air-fuel mixture, said valve assembly comprising:

a unitary valve plate having a plurality of openings therethrough for connecting each branch passage of said intake manifold with one of said intake ports in said engine block assembly;

a valve disposed in each of said openings and movable through a range of positions including a closed position for substantially completely obstructing said opening and an open position for minimally obstructing said opening; and means cooperable with said valves for effecting said movement of said valves through said range of positions.

* * * * *